United States Patent
Häger et al.

(10) Patent No.: US 10,584,519 B2
(45) Date of Patent: Mar. 10, 2020

(54) BOWDEN CABLE SEALING FOR A LOCK MODULE

(71) Applicant: Brose Schliesssysteme GmbH & Co. KG, Wuppertal (DE)

(72) Inventors: Ole Häger, Wuppertal (DE); Rene Faust, Dorsten (DE)

(73) Assignee: Brose Schliesssysteme GmbH & Co. KG, Wuppertal (DE)

( * ) Notice: Subject to any disclaimer, the term of this patent is extended or adjusted under 35 U.S.C. 154(b) by 0 days.

(21) Appl. No.: 15/704,869

(22) Filed: Sep. 14, 2017

(65) Prior Publication Data

US 2018/0094462 A1    Apr. 5, 2018

(30) Foreign Application Priority Data

Sep. 15, 2016  (DE) .................... 10 2016 117 435

(51) Int. Cl.
  *F16C 1/10*   (2006.01)
  *E05B 79/20*  (2014.01)
  (Continued)

(52) U.S. Cl.
  CPC .............. *E05B 79/20* (2013.01); *F16C 1/101* (2013.01); *F16C 1/107* (2013.01); *F16C 1/145* (2013.01); *E05B 79/08* (2013.01); *E05B 85/02* (2013.01)

(58) Field of Classification Search
  CPC .. F16C 1/10; F16C 1/101; F16C 1/107; F16C 1/14; F16C 1/145; E05B 79/08; E05B 79/20; E05B 85/02
  See application file for complete search history.

(56) References Cited

U.S. PATENT DOCUMENTS 2,550,669 A    5/1951  Brickman
2,845,812 A *  8/1958  Pobar ................... B60T 11/046
                                                 188/204 R
(Continued)

FOREIGN PATENT DOCUMENTS

CN    203130759 U    8/2013
CN    203500251 U    3/2014
(Continued)

OTHER PUBLICATIONS

EP Search Report for Application No. 17191456.7 dated Feb. 8, 2018.
(Continued)

*Primary Examiner* — Adam D Rogers
(74) *Attorney, Agent, or Firm* — LKGLOBAL | Lorenz & Kopf

(57) ABSTRACT

A motor vehicle lock module is provided for actuating a vehicle component which includes a locking element and a Bowden cable with a Bowden cable grommet and a core which is guided movably in the Bowden cable sleeve for the transmission of an adjusting force. The core is connected to the adjusting element at a first end. The Bowden cable sleeve can be received at least at a first end in an end piece. Furthermore, a one-piece seal is provided, which encloses the first end of the Bowden cable sleeve in a first region and extends in a second region via a region of the core emerging from the Bowden cable sleeve and sealing on the core is applied. The seal is designed to be pressed into the Bowden cable grommet in an end-piece-received condition in the first region from an end piece.

17 Claims, 1 Drawing Sheet

(51) Int. Cl.
*F16C 1/14* (2006.01)
*E05B 85/02* (2014.01)
*E05B 79/08* (2014.01)

(56) References Cited

U.S. PATENT DOCUMENTS

| | | | | |
|---|---|---|---|---|
| 3,221,572 | A | * 12/1965 | Swick | B60T 11/00 |
| | | | | 248/56 |
| 4,131,379 | A | 12/1978 | Gordy et al. | |
| 4,534,239 | A | 8/1985 | Heimann | |
| 4,621,937 | A | 11/1986 | Maccuaig | |
| 4,773,280 | A | 9/1988 | Baumgarten | |
| 4,963,050 | A | 10/1990 | Wendt et al. | |
| 5,199,320 | A | * 4/1993 | Spease | F16C 1/262 |
| | | | | 74/502.4 |
| 5,546,827 | A | * 8/1996 | Pospisil | F16C 1/105 |
| | | | | 74/502 |
| 5,809,840 | A | * 9/1998 | Oda | B62J 23/00 |
| | | | | 74/500.5 |
| 5,875,687 | A | * 3/1999 | Oda | B62J 23/00 |
| | | | | 74/502.4 |
| 7,650,814 | B2 | * 1/2010 | Watarai | B60T 11/046 |
| | | | | 74/502.5 |
| 2013/0220059 | A1 | 8/2013 | Chiou | |

FOREIGN PATENT DOCUMENTS

| | | | |
|---|---|---|---|
| CN | 204692303 U | 10/2015 | |
| CN | 204878275 U | 12/2015 | |
| DE | 10132000 A1 | 1/2003 | |
| DE | 102006019718 A1 | 10/2007 | |
| DE | 102006034069 A1 | 1/2008 | |
| DE | 102007025924 B3 | 7/2008 | |
| DE | 102007044287 A1 | 3/2009 | |
| DE | 102011110975 A1 | 9/2012 | |
| DE | 102011007720 A1 | 10/2012 | |
| DE | 102013221232 A1 | 4/2015 | |
| EP | 1715199 A2 | 10/2006 | |
| FR | 2678030 A1 | * 12/1992 | F16C 1/107 |
| FR | 2928185 A1 | 9/2009 | |
| JP | 2009121524 A | 6/2009 | |
| JP | 2009138855 A | 6/2009 | |
| WO | 2004001227 A1 | 12/2003 | |
| WO | 2004072497 A1 | 8/2004 | |
| WO | 2010001124 A2 | 1/2010 | |
| WO | 2011023262 A2 | 3/2011 | |

OTHER PUBLICATIONS

German Search Report for Application No. 102016117435.1 dated Mar. 6, 2017.

* cited by examiner

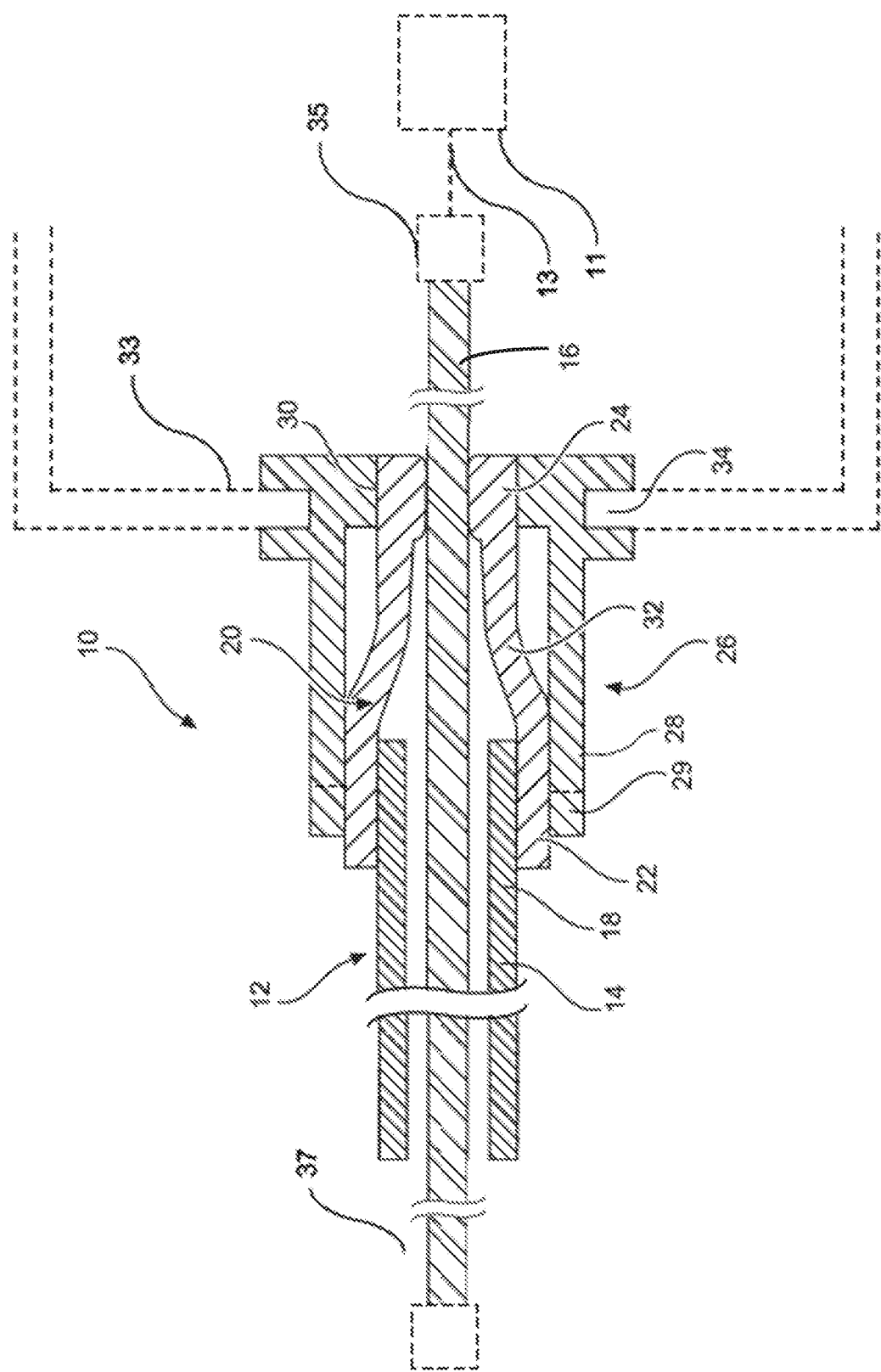

BOWDEN CABLE SEALING FOR A LOCK MODULE

CROSS REFERENCE TO RELATED APPLICATION

This application claims priority to German Patent Application No. DE 10 2016 117 435.1 filed Sep. 15, 2016, which is incorporated herein by reference in its entirety.

TECHNICAL FIELD

The present invention relates to a vehicle adjuster module and a vehicle adjuster arrangement as well as a method for assembly of a sealing of a vehicle adjuster module.

TECHNICAL BACKGROUND

Vehicle adjuster modules are used, for example, in vehicle doors, e.g. to operate a door lock, for example to lock or unlock. For transmission of an actuating force at a vehicle adjuster module, for example, a bowden cable is used extending from a point at which the actuating force is applied to an adjuster element, for example a lock device. However, even with bowden cables that run in a vehicle door, dirt and water can enter the interior of the bowden cable. This can, for example, lead to an increase in friction of the core in the bowden cable envelope. Dirt and water penetrate, for example, at the ends of the bowden cable envelope, at which ends the core exits from the envelope and moves there in relation to the bowden cable envelope. In order to prevent, or at least to reduce, the dirt and the entering of humidity into the interior, sealings are used. For example, DE 10 2011 110 975 A1 describes a bellow shaped sealing, which extends from the end of the envelope of the bowden cable over an exposed portion of the core. It has been shown that bellow shaped sealings are relatively complex in production.

SUMMARY

Thus, an object of the present invention is to provide a sealing for a vehicle adjuster module, which sealing can be assembled and mounted as simple as possible and which is cost effective at the same time.

This need is achieved by a vehicle adjuster module, a vehicle adjuster arrangement and by a method for assembly of a sealing of a vehicle adjuster module according to one of the independent claims. Exemplary embodiments are shown in the sub-claims.

According to the invention, a vehicle adjuster module is provided to operate an adjustable vehicle component. The vehicle adjuster module comprises an adjuster element and a bowden cable with a bowden cable envelope and a core, which is movably guided for transmission of an adjustment force. The core is connected to the adjuster element at a first end. The bowden cable envelope is receptible at least at a first end in an end part. Furthermore, a one-piece sealing is provided that encloses the first end of the bowden cable envelope at a first region, and that, in a second region, extends over a region of the core beyond a portion of the core exiting the bowden cable envelope. The sealing is configured to be pressed against the bowden cable envelope by an end part in the first region in a state in which it is received in an end part.

By this, a sealing of a vehicle adjuster module is provided that is simple and cost effective. In addition, the arrangement of the sealing between the bowden cable envelope and the end part ensures a simple and reliable sealing.

The bowden cable may also be referred to as adjustment means.

The term "abuts in a sealing manner" refers to a configuration, in which the core is freely movable and wherein the entering of humidity and dirt is prevented or reduced at the same time. This can normally be done by the sealing actually abutting the core and contacting the core; this can theoretically at least also be done by providing a minimum gap between the core and the sealing.

The adjuster element, for example, is an opening of a locking element for a movable vehicle component, e.g. a lock module for a vehicle door. The term vehicle door relates to doors, flaps or other movable elements on a vehicle, by which openings may be locked or made accessible. This comprises especially pivotable vehicle doors, sliding doors of a vehicle, rear doors and tail gates as well as other flaps, e.g. also tank flaps.

The adjuster module is an adjuster element for a vehicle component, for example, e.g. a brake, for example a parking brake.

The adjuster element is a control element, for example, for a regulation component, e.g. a wire rope for a throttle valve for engine control.

In an example, the core is a rope, e.g. in the shape of a steel rope. The rope can also consist of other materials, e.g. plastic fibers, carbon fibers or aramid fibers.

For example, the core consists of multiple stranded wire of steel and is for example coated with a coating.

In a further example, the core is configured as a tensile and pressure element. For example, the core consists of a spring steel wire, which is to some extent elastically bendable and which is adapted for guiding in the bowden cable envelope, which can be installed in a bent running manner.

The core is provided, for example at one end or both ends, with an end part of the core. For example, the end part of the core is provided as a connection part, which can be suspended in a suspension for force transmission. The connection part is for example a barrel, a ball or a hook or an eyelet, which is poured, pressed or squeezed onto the end of the wire or cable, e.g. the end of the rope.

In an example, the bowden cable envelope at both ends each is configured with a one-piece sealing and is receptible in an end part.

The sealing can be configured with a sealing segment in the region in which it abuts the core, for example, in the shape of a one-piece designed sealing bead or sealing lip. The sealing lip can be configured as a two or three lip sealing.

In an example, it is provided that the adjuster element is not (yet) fixed to the bowden cable, but that the bowden cable is rather configured to mount an adjuster element. A bowden cable (adjustment means) for operation of an adjustable vehicle component is provided, which comprises a bowden cable envelope and a core, which is movably guided in the bowden cable envelope for force transmission to an adjuster element. The core is connectable with the adjuster element. The bowden cable envelope is receptible in an end part at least at one end. A one-piece sealing is provided that encloses the at least first end of the bowden cable envelope in a first region, and that, in a second region, extends over a region of the core beyond a portion of the core exiting the bowden cable envelope and that abuts on the core in a sealing manner. The sealing is configured to be pressed against the bowden cable envelope by an end part in the first region in a state, in which it is received in an end part.

In an example, it is provided that the bowden cable is already configured with an end part: A bowden cable (adjustment means) for operation of an adjustable vehicle component is provided, which comprises a bowden cable envelope and a core, which is movably guided in the bowden cable envelope for force transmission to an adjuster element. The core is connectable with the adjuster element. The bowden cable envelope is received in an end part at least at one end. A one-piece sealing is provided, which, in a first region, encloses a first region of the at least one end of the bowden cable envelope, and that, in a second region, extends over a portion of the core, which exits the bowden cable envelope and which abuts on the core in a sealing manner. The sealing is pressed against the bowden cable envelope in the first region from an inner wall of the receptacle of the end part.

According to an example, the sealing is configured to extend, in the received state, in the second region at least to an opening of the end part, from which the core exits, and preferably to be pressed from the opening rim against the core.

The pressing of the sealing against the core takes place in such a manner that no water and dirt can enter inbetween, and at the same time that the core can be moved with as low as possible frictional resistance.

According to an example, an end part is provided with a receptacle for the at least one end of the bowden cable envelope to support the bowden envelope in longitudinal direction, and an opening from which the core exits. The sealing is pressed against the bowden cable envelope by the receptacle, and extends, for example, to the opening.

In an example, the sealing is pressed against the bowden cable envelope in the first region from the receptacle in a manner that is distributed over the circumference. The pressing, for example, takes place in an equally distributed manner.

In an example, the sealing is pressed against the bowden cable envelope by the receptacle in the first region in a manner that is distributed along the circumference in a discontinuous manner, e.g. at several points punctiformly, i.e. circumferentially discontinuous, for example by crimping.

In an example, the sealing is pressed against the bowden cable envelope by the receptacle in the first region in a manner that is distributed over the circumference in a continuously distributed manner, i.e. circumferentially continuous.

In an example, the sealing extends to an outer rim of the opening and sits flush with the end part, for example.

For example, the end part has a receptacle opening for inserting the end of the bowden cable envelope. By this, a slit that extends in a longitudinal direction is provided to insert the core sidewardly. The slit can subsequently be locked, e.g. in the manner of a rotatably held sleeve, which also comprises a slit for inserting the core.

According to an example, the sealing abuts on the first region at the outside of the bowden cable envelope in a sealing manner; at the second region, the sealing abuts at the outside of the core in a sealing manner. A transition region is provided between the first region and the second region. The transition area, together with the first and the second region form an effective sealing of the inner bowden cable at the end of the bowden cable.

In an example, the first region forms a solid sealing and the second region forms (in relation to the core) a movable sealing.

The transition region forms an effective sealing of the bowden cable envelope together with the first and the second region.

The one-piece sealing is arranged between (the outside) of the bowden cable envelope and the end part at the first end, and can therefore be pressed in a sealing manner against the bowden cable envelope by the end part. At the second end, the one-piece sealing is arranged between (the outside of) the core and the opening for the core in the end part and can therefore be pressed against the core in a sealing manner by the opening rim of the end part.

The sealing is arranged between the parts to be sealed and the end part.

The one-piece design of the sealing with the two different sealing regions and the connecting transition region enables a simple assembly method. By the positioning between the end part and the bowden cable elements (envelope and core), a sealing abutment is provided that is characterized by an easy assembly and mounting procedure. For example, a crimping enables a very simple and fast assembly.

The end part can be configured with a break- or jointif groove to be inserted and fixed in a bracket. For example, the end part can be fixed at an adjuster element, e.g. a vehicle lock.

According to an example, the end part is mechanically connected to the bowden cable envelope.

The mechanically solid connection is provided to also counteract tensile forces via the connection, e.g. pull-off forces in case that the bowden cable envelope is pulled. The solid mechanical connection can be provided for pull-off forces in the range of approx. 50 to 150 N for example. For example, a mechanically solid connection is provided by a crimping connection. The mechanically solid connection can also be provided by spraying, a metal- or plastic ring or a press fit. A mechanically solid connection is also provided by pushing, gluing or welding.

The mechanically solid connection can be provided for the support of the bowden cable envelope. The support can also take place over the front surface of the bowden cable envelope to the end part.

For example, several protrusions, e.g. three or more, can be provided in the receptacle of the end part so that the front surface of the bowden cable envelope can abut on these. Between the edges, regions can be provided, in which the sealing extends, and a transition is formed between the region of the sealing, which abuts at the outside of the bowden cable envelope, and the region of the sealing, which abuts at the core.

According to an example, the end part is provided at a housing of an adjuster element.

The end part is a part of the housing of the adjuster element, for example. In an example, the end part is designed one-piece at the housing of the adjuster element.

According to the invention, also a vehicle adjuster arrangement is provided, which comprises a vehicle adjuster element for generating an actuating force and a vehicle adjuster module according to the preceding examples. The core is connected to the actuating element at a second end. The actuating force is applied to the adjuster element by the core.

For example, the actuating element is a handle, a lever or an actuator to generate or apply the actuating force respectively.

According to the invention, a method is provided for assembly of a sealing of a vehicle adjuster module. The method comprises the following steps: a) providing a bowden cable with a bowden cable envelope and a core, which is movably guided in the bowden cable envelope to transmit an actuating force; and b) mounting of a one-piece sealing such that the sealing encloses an end of the bowden cable envelope in a first region, and, in a second region, extends over a portion of the core exiting the bowden cable envelope and abuts on the core in a sealing manner; wherein the sealing is configured, in a received state, to be pressed against the bowden cable envelope in the first region by an end part.

According to an example, it is also provided: c) inserting of the end of the bowden cable envelope in a receptacle of an end part, which comprises an opening from which the core exits; wherein the sealing is arranged between the bowden cable envelope and the inner wall of the receptacle, and wherein the sealing preferably extends into the opening.

According to an example, it is provided that in step a), the core is inserted through an opening of an end part with at least one core end part; wherein the core is already arranged in the bowden cable envelope, and, preferably, is configured with two core end parts. Moreover, it is provided, that in step b), the sealing is inserted in the receptacle of the end part, and in step c), the bowden cable envelope and the sealing are inserted into the receptacle.

According to an example, it is provided that in step b), the sealing is pushed onto the bowden cable envelope, wherein the core, which comprises a core end part at least at one end, preferably an end part at each end, already runs in the bowden cable envelope. Moreover, it is provided that in step c), the core is pushed with a core end part through the opening of the end part after the mounting of the sealing; and, subsequently or at the same time, the bowden cable envelope with the sealing mounted on the end is inserted into the receptacle of the end part.

In an example, it is provided: d) pressing the rim of the receptacle to the sealing.

For example, the mechanical connection takes place by crimping or pressing.

In a further example, it is provided that in step d), a solid connection of the end part takes place with the bowden cable envelope, e.g. by mounted crimping (Mounting by crimping), jamming, welding, clogging etc.

In an example, it is provided that the sealing is pushed onto the end of the sealing and the core is then inserted.

In an example, it is provided that the core is already connected to the adjuster element when the sealing is mounted.

In another example, it is provided that the core is connected to the adjuster element after the sealing is mounted.

According to an aspect of the invention, it is provided that a sealing is inserted between the bowden cable envelope and a receptacle of an end part for sealing, and, in order to enhance the sealing, the sealing is being pressed onto the bowden cable envelope. The end part not only serves for the support of the bowden cable envelope, but also for pressing the sealing onto the bowden cable envelope. The sealing extends from the bowden cable envelope over the core, which exits the bowden cable envelope. Due to the arrangement of the sealing in the region of the opening of the end part, from where the core exits, the rim of the opening does not only serve the core to exit, but also that the sealing abuts the core, which moves longitudinally when the bowden cable is actuated.

It should be noted, that the features of the embodiments of the vehicle adjuster module also applies for embodiments of the vehicle adjuster arrangement and the method for assembly of a sealing of a vehicle adjuster module and vice versa. Moreover, those features can also be freely combined for which it is not explicitly said.

BRIEF DESCRIPTION OF THE DRAWINGS

Hereinafter, the embodiments of the invention are outlined in detail based on the enclosed drawing.

FIG. 1 shows a schematic longitudinal cut through a vehicle adjuster module in an extract.

DETAILED DESCRIPTION OF THE EMBODIMENTS

FIG. 1 shows a vehicle adjuster module 10 for actuating an adjustable vehicle component (not shown). The vehicle adjuster module 10 comprises an adjuster element 11 (not shown indicated with hashed lines) and a bowden cable 12 with a bowden cable envelope 14 and a core 16, which is movably guided in the bowden cable envelope 14 for transmission of an actuating force. The core 16 is connected to a first end with the adjuster element (not shown indicated with hashed connection line 13). The bowden cable envelope 14 can be received at least at a first end 18 in an end part. (In FIG. 1, the received state is shown.) Moreover, a one-piece sealing 20 is provided, which encloses at a first region 22 the first end of the bowden cable envelope 14, and which at a second region 24 extends over a portion of the core 16, which exits the bowden cable envelope 14 and which abuts in a sealing manner on the core 16. In this regard, the sealing 20 is configured to be pressed against the bowden envelope 18 from an end part in a first region.

According to an example, the sealing 20 is configured to extend, in a received state, in the second region at least to an opening of the end part (already shown as an option in FIG. 1), from which the core 16 exits, and to be pressed against the core from the opening rim.

In an example, shown as an option in FIG. 1, an end part 26 is provided with a receptacle 28 for the at least one end 18 of the bowden cable envelope to support the bowden cable envelope 14 in longitudinal direction (hence, in direction of the core). Moreover, an opening 30 is provided, from which the core 16 exits. The sealing 20 is pressed against the bowden cable envelope 14 from the receptacle 28 in the first region. Moreover, in an example, the sealing 20 extends to the opening, and ends flush for example; in a not shown example, the sealing 20 extends only just before the opening; in a further example, also not shown, the sealing 20 extends beyond the opening.

At the first region, the sealing 20 abuts in a sealing manner on the outside of the bowden cable envelope 14, and, at the second region, the sealing abuts in a sealing manner on the outside 15 of the core. In an example, a transition region 32 is provided between the first region and the second region, which transition area forms, together with the first and the second region, an effective sealing of the interior of the bowden cable at the end of the bowden cable envelope.

In an example (not further shown), the end part 26 is mechanically connected to the Bowden cable envelope 14 via the sealing 20. A mechanically solid connection 29 is provided to counteract tensile forces via the connection, e.g. pull-off forces in case that the Bowden cable envelope 14 is pulled. The solid mechanical connection 29 can be provided for pull-off forces in the range of approx. 50 to 150 N for example. For example, a mechanically solid connection 29 is provided by a crimping connection. The mechanically solid connection 29 can also be provided by spraying, a metal- or plastic ring or a press fit. A mechanically solid connection is also provided by pushing, gluing or welding.

In a further option, it is provided that the end part 26 is provided at a housing 33 (indicated with hashed lines) of e.g. the adjuster element. In an example, the end part 26 is provided with a groove or recess 34 to be connected to the housing 33.

Moreover, a vehicle adjuster arrangement is provided (not shown in detail), which comprises a vehicle adjuster element for generating an actuating force and a vehicle adjuster module 10 according to one of the preceding examples and options. The core 16 is connected to the actuating element at a second end, e.g. a handle, and the actuating force is applied via the core 16 to the adjuster element.

According to the invention, a method is provided for assembly of a sealing of a vehicle adjuster module (not further shown), which comprises the following steps: a) providing a bowden cable with a bowden cable envelope and a core, which is movably guided in the bowden cable envelope to transmit an actuating force; and b) mounting of a one-piece sealing in such a way, that the sealing encloses an end of the bowden cable envelope at a first region, and which, at a second region, extends over a portion of the core, which exits the bowden cable envelope; wherein, in a received state, the sealing is configured to be pressed against the bowden cable envelope at a first region from an end part. Wherein, preferably, it is provided: c) inserting of the end of the bowden cable envelope in a receptacle of an end part, which comprises an opening from which the core exits; wherein the sealing is arranged between the bowden cable envelope and the inner wall of the receptacle, and from which, preferably, the sealing extends into the opening.

In a further example, it is provided that in step a), the core is inserted through the opening of an end part with at least one core end part 35, wherein the core is already arranged in the bowden cable envelope, and in step b), the sealing is inserted in the receptacle of the end part, and in step c), the bowden cable envelope and the sealing are inserted in the receptacle. In a further option, it is provided inserting the core through the opening of an end part with two core end parts, e.g. the at least one core end part 35 (indicated with hashed-line frame) and an opposite second end part 37 (also indicated with hashed-line frame).

In a further example, it is provided that in step b), the sealing is pushed on the bowden cable envelope, wherein the core, which comprises a core end part at least at one end, or preferably an end part at each end, already runs in the bowden cable envelope; and in step c), the core is pushed with a core end part through the opening of the end part after the mounting of the sealing; and, subsequently or at the same time, the bowden cable envelope with the on the end mounted sealing is inserted in the receptacle of the end part.

The above described embodiments can be combined in diverse forms and ways. In particular, aspects of the devices can be used for the embodiments of the method and vice versa.

In addition, it should be noted that "comprehensively" does not exclude other elements or steps, and "one" or "one" does not exclude a plurality. It should also be pointed out that features or steps which have been described with reference to one of the above exemplary embodiments can also be used in combination with other features or steps of other embodiments described above. Reference numbers in the claims are not to be considered as a limitation.

The invention claimed is:

1. A vehicle adjuster module for actuating an adjustable vehicle component, the vehicle adjuster module comprising:
an adjuster element; and
a Bowden cable with a Bowden cable envelope and a core connected to the adjuster element at a first end and movably guided in the Bowden cable envelope for transmission of an actuating force, wherein a first end of the Bowden cable envelope is receivable in an end part; and
a one-piece sealing enclosing the first end of the Bowden cable envelope in a first region and extending over a first portion of the core beyond a second portion of the core exiting the Bowden cable envelope in a second region;
wherein the one-piece sealing is pressed against the Bowden cable envelope in the first region in a received state, in which it is received in the end part;
wherein the end part comprises:
a receptacle for the first end of the Bowden cable envelope for supporting the Bowden cable envelope in a longitudinal direction;
wherein the core exits from an opening formed therein;
wherein the one-piece sealing is pressed against the Bowden cable envelope in the first region by the receptacle;
wherein the one-piece sealing, in the first region, abuts in a sealing manner on the outside of the Bowden cable envelope, and, in the second region, abuts in a sealing manner on the outside of the core, and the one-piece sealing further comprises a transition region between the first region and the second region, that in combination with the first and the second region, forms a sealing of an inner of the Bowden cable at the first end of the Bowden cable envelope;
wherein the one-piece sealing is pressed against the Bowden cable envelope in the first region by the receptacle in a manner that is distributed over a circumference.

2. The vehicle adjuster module according to claim 1, wherein the one-piece sealing extends, in the received state, in the second region at least to the opening of the end part, from which the core exits.

3. The vehicle adjuster module according to claim 2, wherein the one-piece sealing is pressed against the core by an opening rim.

4. The vehicle adjuster module according to claim 1, wherein the one-piece sealing extends into the opening.

5. The vehicle adjuster module according to claim 1, wherein the end part is mechanically connected to the Bowden cable envelope by a mechanically solid coupling.

6. The vehicle adjuster module according to claim 5, wherein the mechanically solid coupling is selected from the group consisting of a crimping connection, spraying, a metal ring, a plastic ring, an interference fit, a transition fit, gluing or welding.

7. The vehicle adjuster module according to claim 1, wherein the end part is provided at a housing of the adjuster element.

8. The vehicle adjuster module according to claim 1, further comprising an actuating element for generating the actuating force, wherein the core is connected to the actuating element at a second end and the actuating force is applied to the adjuster element by the core.

9. The vehicle adjuster module according to claim 1, wherein the pressing takes place in an equally distributed manner.

10. The vehicle adjuster module according to claim 1, wherein the sealing is pressed against the Bowden cable envelope by the receptacle in the first region in a manner that is discontinuously distributed along the circumference.

11. The vehicle adjuster module according to claim 1, wherein the sealing is pressed against the Bowden cable envelope by the receptacle in the first region in a manner that is continuously distributed along the circumference.

12. A vehicle adjuster module for actuating an adjustable vehicle component, the vehicle adjuster module comprising:
   an adjuster element;
   a Bowden cable with a Bowden cable envelope and a core connected to the adjuster element at a first end and movably guided in the Bowden cable envelope for transmission of an actuating force, wherein a first end of the Bowden cable envelope is receivable in an end part; and
   a one-piece sealing enclosing the first end of the Bowden cable envelope in a first region and extending over a first portion of the core beyond a second portion of the core exiting the Bowden cable envelope in a second region;
   wherein the one-piece sealing is pressed against the Bowden cable envelope in the first region in a state, in which it is received in the end part;
   wherein the end part comprises:
   a receptacle for the first end of the Bowden cable envelope for supporting the Bowden cable envelope in a longitudinal direction;
   wherein the core exits from an opening formed therein;
   wherein the one-piece sealing is pressed against the Bowden cable envelope in the first region by the receptacle;
   wherein the one-piece sealing, in the first region, abuts in a sealing manner on the outside of the Bowden cable envelope, and, in the second region, abuts in a sealing manner on the outside of the core, and the one-piece sealing further comprises a transition region between the first region and the second region, that in combination with the first and the second region, forms a sealing of an inner of the Bowden cable at the first end of the Bowden cable envelope;
   wherein the one-piece sealing is pressed against the Bowden cable envelope in the first region by the receptacle, the end part is mechanically connected to the Bowden cable envelope by a mechanically solid coupling;
   wherein the mechanically solid coupling is provided to also counteract pull-off tensile forces when the Bowden cable envelope is pulled in the range of approx. 50 to 150 N.

13. A method for sealing a vehicle adjuster module comprising:
   providing a Bowden cable with a Bowden cable envelope and a core, which is movably guided in the Bowden cable envelope for transmission of an actuating force; and
   mounting of a one-piece sealing such that the one-piece sealing encloses an end of the Bowden cable envelope in a first region, and, in a second region, extends over a portion of the core exiting the Bowden cable envelope and abuts on the core in a sealing manner;
   wherein the one-piece sealing is, in a received state, pressed against the Bowden cable envelope in the first region;
   wherein the end part comprises:
   a receptacle for the end of the Bowden cable envelope for supporting the Bowden cable envelope in a longitudinal direction;
   wherein the core exits from an opening formed therein;
   wherein the one-piece sealing is pressed against the Bowden cable envelope in the first region by the receptacle;
   wherein the one-piece sealing, in the first region, abuts in a sealing manner on the outside of the Bowden cable envelope, and, in the second region, abuts in a sealing manner on the outside of the core, and the one-piece sealing further comprises a transition region between the first region and the second region, that in combination with the first and the second region, forms a sealing of an inner of the Bowden cable at the first end of the Bowden cable envelope;
   wherein the one-piece sealing is pressed against the Bowden cable envelope in the first region by the receptacle in a manner that is distributed over a circumference.

14. The method according to claim 13, further comprising inserting the end of the Bowden cable envelope in the receptacle of the end part that comprises the opening, from which the core exits, wherein the one-piece sealing is arranged between the Bowden cable envelope and an inner wall of the receptacle and the one-piece sealing extends into the opening.

15. The method according to claim 14, further comprising:
   inserting the core through the opening of the end part with at least one core end part, wherein the core is already arranged in the Bowden cable envelope;
   inserting the one-piece sealing in the receptacle of the end part; and
   inserting the Bowden cable envelope and the one-piece sealing in the receptacle of the end part.

16. The method according to claim 15, wherein the at least one core end part includes two core end parts, the method further comprising inserting the core through the opening of the end part with the two core end parts.

17. The method according to claim 14, further comprising:
   pushing the one-piece sealing onto the Bowden cable envelope, wherein the core, which comprises a core end part at least on one of a first end and a second end of the Bowden cable envelope, already runs in the Bowden cable envelope;
   pushing the core with the core end part through the opening of the end part after a mounting of the one-piece sealing; and
   at the same time or subsequently inserting the Bowden cable envelope into the receptacle of the end part with the one-piece sealing mounted onto the end of the Bowden cable.

* * * * *